United States Patent
Dole et al.

(12)
(10) Patent No.: US 6,286,810 B1
(45) Date of Patent: Sep. 11, 2001

(54) VALVE WITH CARTRIDGE

(75) Inventors: Douglas R. Dole, Whitehouse Station, NJ (US); W. Ross McLennan, Easton; Richard R. Weston, Nazareth, both of PA (US)

(73) Assignee: Victaulic Company of America, Easton, PA (US)

( * ) Notice: Subject to any disclaimer, the term of this patent is extended or adjusted under 35 U.S.C. 154(b) by 0 days.

(21) Appl. No.: 09/706,422

(22) Filed: Nov. 3, 2000

Related U.S. Application Data

(63) Continuation-in-part of application No. 09/629,411, filed on Aug. 1, 2000.

(51) Int. Cl.$^7$ ....................................................... F16K 5/00

(52) U.S. Cl. ........................ 251/304; 251/308; 251/315.1

(58) Field of Search .................................... 251/305, 308, 251/315.01, 315.1, 304

(56) References Cited

U.S. PATENT DOCUMENTS

| | | | |
|---|---|---|---|
| 443,326 | * | 12/1890 | Leverich . |
| 850,622 | * | 4/1907 | Clark . |
| 2,282,825 | * | 5/1942 | Puffer . |
| 2,676,604 | * | 4/1954 | Senna . |
| 2,924,424 | * | 2/1960 | Titterington . |
| 4,373,542 | * | 2/1983 | Scaramucci ............................ 137/72 |
| 4,944,490 | * | 7/1990 | Kennedy ............................... 251/306 |
| 5,342,019 | * | 8/1994 | Braun .................................... 251/305 |
| 5,467,796 | * | 11/1995 | Pettinaroli et al. .................. 137/238 |
| 5,735,307 | * | 4/1998 | Charron ................................ 137/270 |
| 5,743,512 | * | 4/1998 | Greenberg ............................ 251/307 |

OTHER PUBLICATIONS

Norriseal Design, p. 27 of Catalog depicting Parts List (undated).
Bray Valve and Controls, Series 22/23, 1 page depicting "The Bray HPV High Performance Valve PTFE, Conductive PTFE & UHMWPE 150psi (10 bar)" (undated).
Center Line, p. 7 of Catalog depicting "Center Line Series B–285/400 High Pressure Butterfly Valves Six Ways Better" (undated).
DeZurik, p. 2 of Catalog dated Nov. 1986 depicting "Design & Construction" of Butterfly Valves.
W–K–M Division of ACF Industries, Inc., p. 5 of Catalog M depicting "W–K–M DynaCentric Valve Design Features" (undated).

* cited by examiner

*Primary Examiner*—Kevin Shaver
*Assistant Examiner*—David A Bonderer
(74) *Attorney, Agent, or Firm*—Synnestvedt & Lechner LLP

(57) ABSTRACT

A valve having a valve closing member rotatably supported on one or more valve stems which are positionally infinitely adjustable is disclosed. The valve has a valve body defining a bore with an upper passageway extending from the bore. A valve stem extends coaxially through the passageway and rotatably supports the valve closing member in the bore. A cartridge is coaxially located within the passageway between the valve body and the stem. The cartridge captures the valve stem and engages the passageway via screw threads allowing for infinite positional adjustment. The cartridge also houses bearings for rotation of the stem and seals for sealing the passageway. The valve body may have a second passageway coaxially aligned with the first passageway in which a second valve stem is located. The second stem engages the passageway via screw threads allowing for infinite positional adjustment. The adjustable stems allow the valve closing member to remain perfectly centered within the bore for maximum valve operational life.

41 Claims, 7 Drawing Sheets

VALVE WITH CARTRIDGE

RELATED APPLICATION

This application is a continuation-in-part of and claims the benefit of prior filed co-pending U.S. application Ser. No. 09/629,411, filed Aug. 1, 2000.

FIELD OF THE INVENTION

This invention relates to valves having a valve closing member rotatably supported on one or more valve stems.

BACKGROUND OF THE INVENTION

Valves, such as butterfly valves and ball valves, for example, have a closing member, such as a disc or a ball, located within the valve bore defined by the valve body. The closing member is supported on one or more valve stems for rotational motion between an open position, allowing flow through the valve bore, and a closed position, preventing flow. At least one valve stem is used to effect rotation of the closing member, and therefore, the valve stem must penetrate the valve body to enable it to be turned to externally effect closing member rotation. The stem may be turned manually or by an actuator for example. Typically The valve stem is accommodated in a passageway extending through the valve body from the valve bore.

The passageway is subjected to the fluid pressure within the valve bore and must be sealed to prevent leakage through the clearance in the passageway between the valve stem and the valve body. Traditionally, the valve stem seal is effected by a valve packing, for example, a fibrous material, a compressible elastomeric material or a polymeric material arranged in the passageway between the valve stem and valve body. A follower engages the valve packing and compresses it to effect a fluid tight seal within the passageway. The follower is forced into the packing by means of integral threading of a flange bolted to the valve body, the packing compression being effected by applying torque to the follower or the flange bolts. As the seal wears, more torque is applied increasing the compression of the packing to stop any leaks.

Seals formed by traditional packing are not effective if the valve body within the passageway becomes corroded. The packing cannot form a long lasting fluid-tight seal against a corroding surface regardless of how tightly it is compressed within the passageway. The corrosion continues to eat away at the sealing surface rendering the packing ineffective. The leak even accelerates the corrosion process, and if it is desired to properly seal the valve, the valve must be disassembled, the corrosion removed and the packing replaced.

Yet another problem associated with valves having valve stems is the lack of adjustability with regard to valve closing member positioning within the valve bore. This is especially problematic for the butterfly valve which has a closing member comprising a slanted disc, wherein the face of the disc is angularly oriented with respect to the valve bore. The slanted disc has a circumferential elastomeric seal which interfaces with a circumferential seat on the valve bore.

The disc is supported on two valve stems arranged diametrically oppositely from one another across the disc. Valve stem bearings are associated with the valve stems to permit relative rotation between the stem and the valve body or the disc and the valve stem. Due to the accumulation of tolerances between the valve body, valve stems and valve disc, the disc is usually not perfectly centered within the valve bore upon assembly. Centering of the disc is necessary to ensure proper functioning of the valve seal, to provide even wear of the seal to maximize valve life, to minimize the operating torque required to actuate the valve and to prevent undesired contact between the disc and the valve bore at points other than between the valve seal and seat.

Centering of the disc within the valve bore is typically accomplished by means of shims. This is a time consuming activity which must be done by hand and, therefore, increases the cost of valve assembly. Furthermore, the accuracy of the shimming is limited by the accuracy of the shims used and the process by which the required shims are determined. The inherent lack of shimming accuracy may lead to imperfectly centered discs and/or allow for unwanted free motion of the disc in a direction along the axis of the valve stems. These problems lead to accelerated valve failure as explained below.

When the slanted disc is in the closed position or partially opened in a "throttling" condition, the differential fluid pressure within the valve bore causes a load on the disc which is purely perpendicular to the face of the disc. Since the disc is angularly oriented with respect to the bore and the valve stems, the load on the disc is conveniently resolved into two components, one component being perpendicular and the other being parallel to the valve stems. The load component perpendicular to the valve stems is reacted by the aforementioned valve stem bearings and the valve stems. However, any free motion in the disc along the axis of the valve stems due to tolerance stack up and shimming inaccuracy will allow the disc to shift within the valve bore in response to the load component parallel to the valve stems. The load parallel to the valve stems will compress one segment of the disc against the valve seat, increasing the compressive force between the circumferential seal and the seat along that segment. The same load simultaneously pulls an opposing segment of the disc away from the seat, reducing the compressive force between the circumferential seal and the seat along that opposing segment.

The segment of the seal seeing the greater compressive force tends to wear faster upon valve actuation than the segment of the seal diametrically opposite on the disc. This leads to accelerated seal failure and shorter valve life. It may also result in metal to metal contact between the valve disc and the seat, causing damage to the seat and resulting in greater torque being required to open and close the valve. Furthermore, the portion of the seal seeing the reduced compressive force may not seal effectively against the seat and may tend to leak under the differential pressure in the valve bore.

SUMMARY AND OBJECTS OF THE INVENTION

The invention concerns a valve comprising a valve body defining a valve bore. A passageway extends through the valve body to the valve bore along an axis oriented transversely to the valve bore. An elongated valve stem is positioned coaxially within the passageway. A valve closing member is positioned within the valve bore and is rotatably supported on the valve stem. The valve closing member is rotatable between a first position, allowing flow through the valve bore at a first flow rate, and a second position, restricting flow through the valve bore. The first position could, for example, allow flow at a maximum rate through the valve, while the second position could allow flow at a second flow rate less then the first rate, the valve serving to throttle the flow. The second position may also be a closed position, preventing flow through the valve.

A cartridge is positioned coaxially within the passageway between the valve stem and the valve body. Preferably, an internal screw thread is positioned coaxially within the passageway and an external screw thread is arranged circumferentially on the cartridge. The screw threads are capable of mating engagement with one another for removably positioning the cartridge within the passageway. The cartridge preferably houses at least one seal, positioned in the passageway between the cartridge and the valve stem. The seal is preferably an elastomeric seal, such as an O-ring. Preferably, the cartridge is comprised of a corrosion resistant material, such as stainless steel, to ensure that the seal does not leak due to corrosion.

The cartridge is also used to retain the valve stem within the passageway thereby preventing the stem from being expelled from the valve when pressurized. This is preferably accomplished by arranging a contact surface which extends radially outwardly from the first valve stem and positioning a mating surface on the cartridge facing the valve bore. The mating surface engages the contact surface and retains the valve stem within the passageway against any internal pressure within the valve.

The cartridge further provides accurate guidance and load bearing capacity by providing an integral radial bearing or accommodating a separate radial bearing which is located coaxially within the cartridge to support the valve stem against any loads perpendicular to the valve stem.

The single valve stem design is preferable for ball valves which do not require a second stem to support the valve closing member. For valves such as butterfly valves having a closing member in the form of a disc, however, a second stem is preferred.

In the butterfly valve, a second passageway extends through the valve body to the valve bore. The second passageway is coaxially aligned with the first passageway. A second elongated valve stem is positioned coaxially within the second passageway, the valve closing member being rotatably supported on both the first and second valve stems. To provide adjustability for positioning the valve closing member at a predetermined position (preferably centered) within the bore, the first and second valve stems are movable along the axis transverse to the valve bore within their respective first and second passageways. Once the valve stems are located at respective predetermined positions within the first and second passageways which position the valve closing member at the desired location, the valve stems are fixed in position by means for adjustably securing each of the first and second valve stems.

Preferably, the adjustable securing means for the first valve stem comprises screw threads arranged on the valve body coaxially within the first passageway and mating screw threads arranged circumferentially on the cartridge. The cartridge is adjustably positionable along the axis within the first passageway upon relative rotation between the cartridge and the valve body due to the action of the mating screw threads and will remained secured at that position until the cartridge is further rotated. Means for preventing rotation, for example, jam nuts, set screws, anaerobic sealants, staking, may be used to ensure that the cartridge remains securely fixed in position.

The interface between the cartridge and the first valve stem is provided by a surface on the cartridge arranged facing the valve bore and movable into engagement with a mating surface extending radially outwardly from the first valve stem. The first valve stem is adjustably secured between the cartridge and the valve closing member upon engagement of the cartridge surface and the mating surface on the stem.

The valve closing member in the butterfly valve is also supported by the second valve stem which requires its own adjustable securing means, preferably comprising screw threads arranged on the valve body coaxially within the second passageway and mating screw threads arranged circumferentially around a portion of the second valve stem. The second valve stem is thus infinitely adjustably positionable within the second passageway upon relative rotation between the cartridge and the valve body due to the screw action of the mating threads. The second valve stem will remain secured in its position until it is further rotated. Again, the aforementioned means to prevent rotation can be used on the second valve stem.

In an alternate embodiment of a cartridge for adjustably securing the valve closing member by adjustably securing the valve stem, the cartridge, located coaxially within the passageway between the valve stem and the valve body, comprises a lower portion and an upper portion adjustably positionable within the passageway. The cartridge lower portion has a lower support surface engageable with a contact surface formed on the valve stem facing the valve bore. Preferably, the contact surface is formed by a portion of the valve stem which has an enlarged diameter extending outwardly of the valve stem. The cartridge further comprises an upper portion also adjustably positionable within the passageway. The upper portion has an upper support surface engageable with another contact surface extending outwardly from the valve stem and facing away from the valve bore. The valve stem is captured between the upper and lower portions and is, thereby, adjustably positionable within said first passageway, thus, providing for adjustable positioning of the valve closing member which is rotatably supported on the valve stem.

In the alternate embodiment, the upper and lower cartridge portions preferably comprise two independent components, each being independently adjustably positionable within the passageway. The preferred means for adjustably positioning and securing the cartridge portions comprises internal screw threads arranged coaxially within the passageway and external screw threads arranged circumferentially around the cartridge upper and lower portions. The external screw threads are engageable with the internal screw threads for adjustably positioning the cartridge portions within the passageway. Alternatively, the upper and lower portions may be separably joined together and the external screw threads arranged on either one of the upper or lower cartridge portions.

The alternate embodiment cartridge is advantageously used with butterfly valves having a valve closing member comprising a disc with a surface oriented transversely to the valve bore and a circumference continuously sealingly engageable with said valve bore. The disc is rotatable by means of the valve stem into a position reducing the flow through the valve bore. Such butterfly valves may have a second passageway extending through the valve body to the valve bore. The second passageway is coaxially aligned with the first named passageway and houses a second elongated valve stem positioned longitudinally within said second passageway. The valve closing member is rotatably supported on said second valve stem.

Preferably, the cartridge is made of a corrosion resistant material such as stainless steel and has a seal, such as an elastomeric seal, positioned in one of the upper or lower portions.

It is an object of the invention to provide a valve having a cartridge which will provide a reliable, easily replaceable seal which eliminates the traditional valve packing.

It is an object of the invention to provide a valve having a cartridge which provides a non-corroding sealing surface.

It is another object of the invention to provide a cartridge for guiding and retaining a valve stem within a valve.

It is yet another object of the invention to provide a cartridge having a load bearing capacity supporting a valve stem.

It is still another object of the invention to provide a cartridge which is infinitely positionable within a valve to adjustably secure the valve stem and thereby adjustably position a valve closing member within the valve.

It is again another object of the invention to provide a valve having a valve closing member supported on valve stems which are adjustably positionable and securable within the valve to adjustably position the valve closing member at a desired position within the valve bore.

It is yet another object of the invention to provide a valve wherein the position of the valve closing member can be adjusted within the valve bore without the use of shims.

It is still another object of the invention to provide a valve wherein the valve closing member can be adjustably positioned within the valve bore at an optimum position to ensure uniform seal wear for maximum seal life and minimum valve actuating torque.

These and other objects of the invention will become apparent from a consideration of the following drawings and detailed description of the preferred embodiment.

DETAILED DESCRIPTION OF THE PREFERRED EMBODIMENTS

Figure 1:
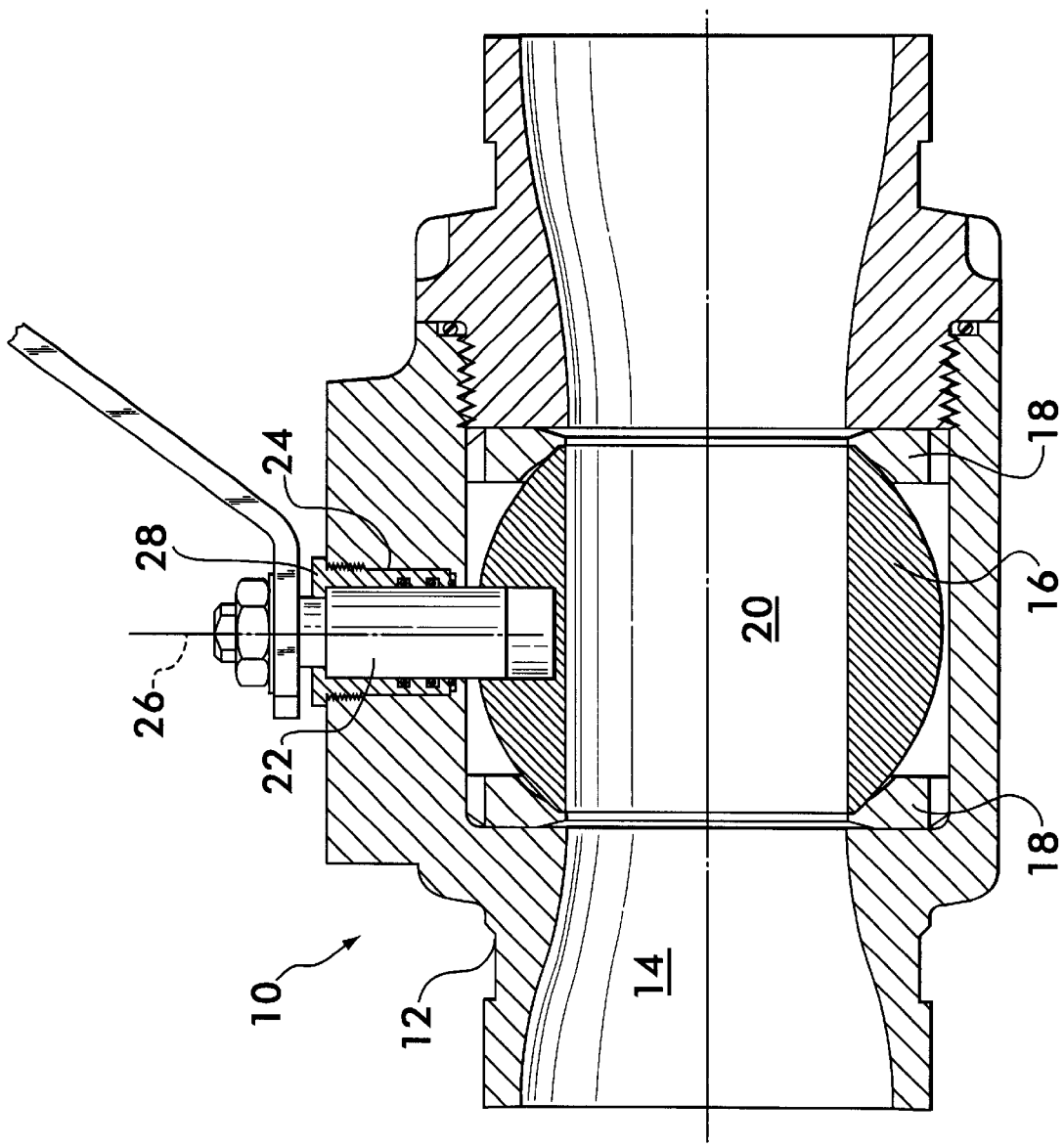
FIG. 1 is a longitudinal sectional view of a ball valve according to the invention.

FIG. 1 shows a ball valve 10 comprising a valve body 12 defining a valve bore 14. A valve closing member in the form of ball 16 is positioned within valve bore 14 and interfaces with valve seats 18 to effect a fluid tight seal between the ball 16 and the valve body 12. Ball 16 has an aperture 20 therethrough, the aperture being positioned in fluid communication with valve bore 14 when the valve closing member (ball 16) is in the open position (shown) allowing flow through the valve. The valve closing member is rotatable to a closed position, wherein the aperture 20 is oriented generally perpendicularly to valve bore to seal the valve preventing flow.

Figure 2:
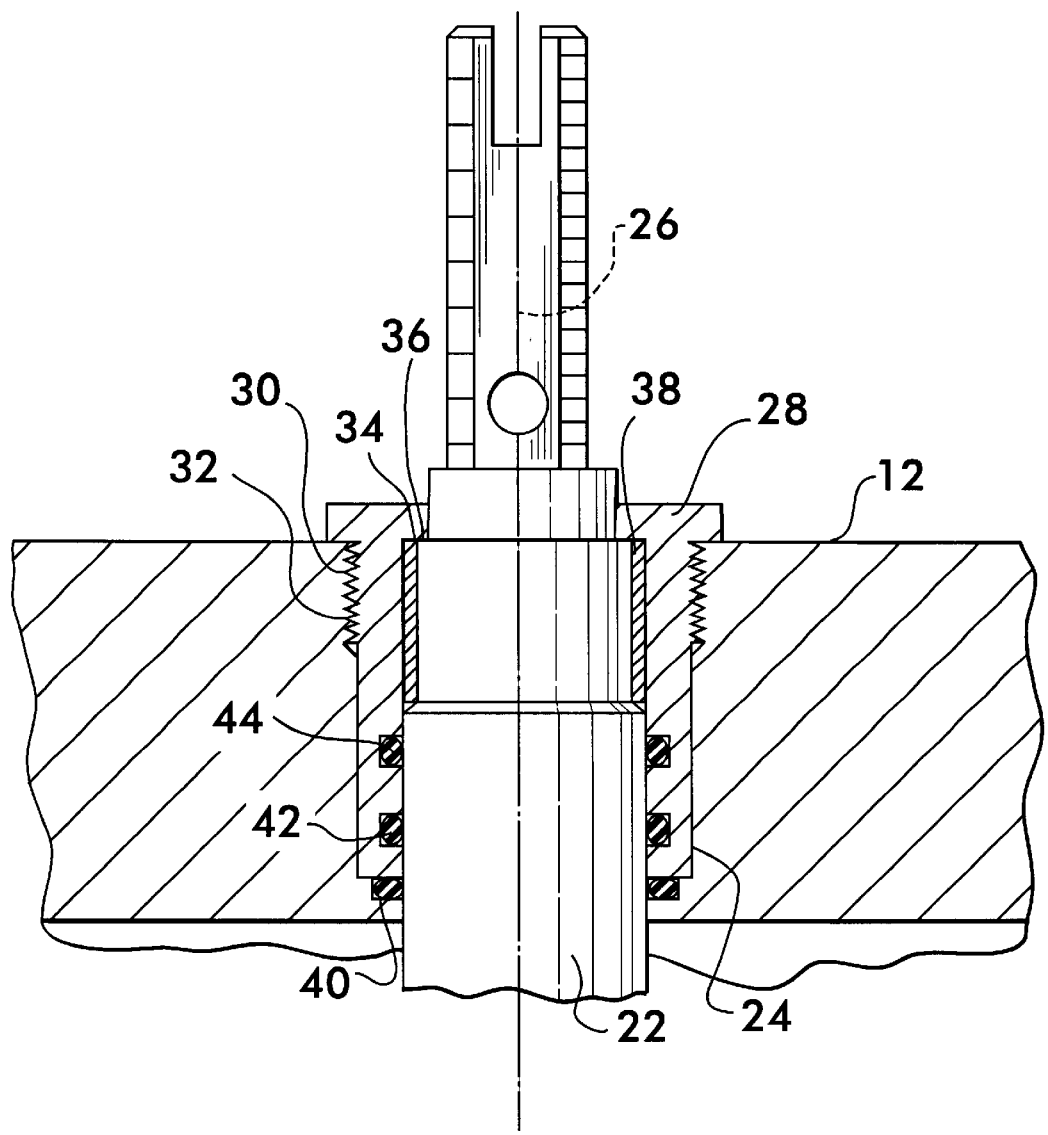
FIG. 2 is a detailed view of a portion of the valve shown in FIG. 1 on an enlarged scale.

Ball 16 is rotatably supported on a valve stem 22 which is positioned coaxially within a passageway 24 extending through the valve body 12 along an axis 26 arranged transversely to the valve bore 14. Valve stem 22 is retained and supported within passageway 22 by a cartridge 28, shown in detail in FIG. 2.

Cartridge 28 interfits coaxially within passageway 24 and is removably retained therein by internal screw threads 30 arranged coaxially within passageway 24 and external screw threads 32 arranged circumferentially on cartridge 28 for mating engagement with internal screw threads 30. While the screw threads are preferred, other means for retaining the cartridge, such as with set screws, snap rings or jam nuts are also feasible.

One of the functions provided by the cartridge 28 is to retain valve stem 22 within passageway 24 against internal pressure within the valve bore which may tend to blow the stem out of the valve body. The retaining function is effected by means of a mating surface 34 arranged on the cartridge 28 facing the valve bore 14. Mating surface 34 engages a contact surface 36 which extends radially outwardly from valve stem 22, thereby retaining the valve stem within the passageway.

Another function of the cartridge 28 is to support the valve stem 22 by housing a radial bearing 38 positioned coaxially within the cartridge between it and the valve stem. The radial bearing supports the stem against lateral and bending loads caused by differential pressure when the valve is closed and permits the stem to turn relatively to the cartridge to effect opening and closing of the closing member, ball 16.

Cartridge 28 also houses the seals required to seal the space between the stem 22 and the passageway 24. Preferably, the cartridge has a static seal 40 arranged between the end of the cartridge and the valve body 12 to prevent fluid from leaking around the cartridge. Two stem seals 42 and 44 are positioned in the passageway 24 between the cartridge 28 and the valve stem 22 to prevent leakage between the cartridge and the valve stem.

There are significant advantages gained by using cartridge 28 to house seals 40, 42 and 44 to seal the passageway. The cartridge eliminates the need for valve packing material and allows elastomeric seals, such as O-rings to be used. The cartridge may be made of a corrosion resistant material such as stainless steel, thus, eliminating the occurrence of seal failure due to corroded sealing surfaces, yet avoids the expense of fabricating the entire valve of corrosion resistant material. The sealing surfaces of the cartridge may be machined to close tolerances and smooth finishes to ensure a fluid tight seal. The cartridge can be machined relatively inexpensively and more accurately as compared with the costs required to machine the surfaces of the passageway which is fixed within the valve body. The cartridge is also readily removable allowing rapid replacement of seals in the field without removing the entire valve from the line.

In another embodiment of the invention, the cartridge is used with a butterfly valve. The butterfly valve is an example of a class of valves having two valve stems supporting the valve closing member. In addition to the aforementioned advantages realized for the ball valve embodiment having the single valve stem, the two stem butterfly valve embodiment realizes additional significant advantages as described below.

Figure 3:
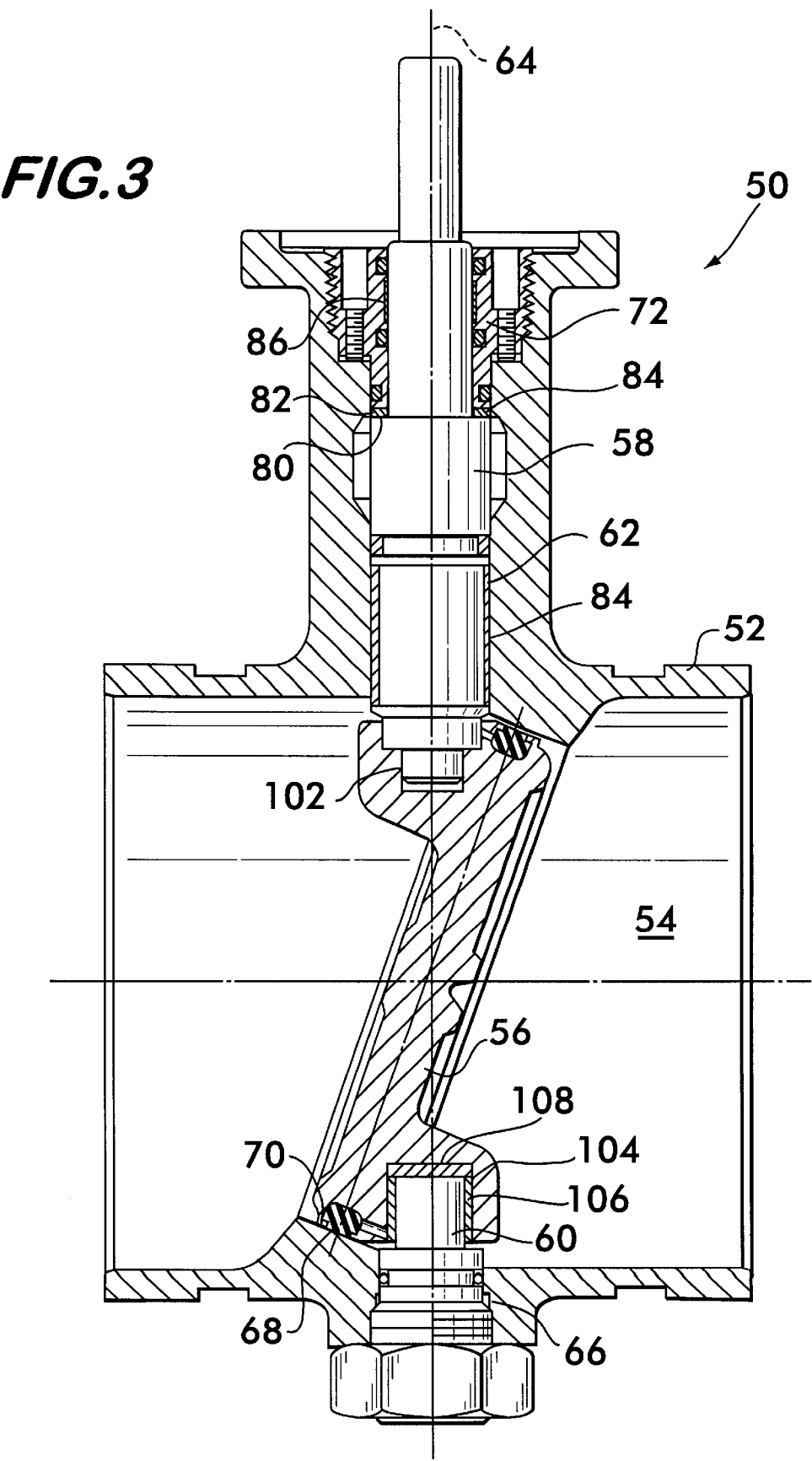
FIG. 3 is a longitudinal sectional view of a butterfly valve according to the invention.

FIG. 3 shows a slant disc butterfly valve 50 having a valve body 52 defining a valve bore 54. The valve closing member comprises a slanted disc 56 positioned within bore 54 and rotatably supported on an upper valve stem 58 and a lower valve stem 60. Upper valve stem 58 is positioned coaxially within an upper passageway 62 which extends along an axis 64 through the valve body 52 from bore 54. Lower valve stem 60 is coaxially positioned in a lower passageway 66 which is coaxially aligned with upper passageway 62. Alignment of the valve stems 58 and 60 with axis 64 allows the slanted disc to be rotated about the axis between a closed position (shown) where the disc is positioned transversely to the direction of flow through the bore 54, thereby preventing flow, to an open position permitting flow. Rotation of the disc 56 is effected by rotating upper valve stem 58 by means of an actuator for example.

The slanted disc 56 has a circumferential seal 68 which interfaces with a valve seat 70 to effect a fluid tight seal between the slanted disc 56 and the valve body 52 to prevent leakage when the disc is in the closed position shown.

Figure 4:
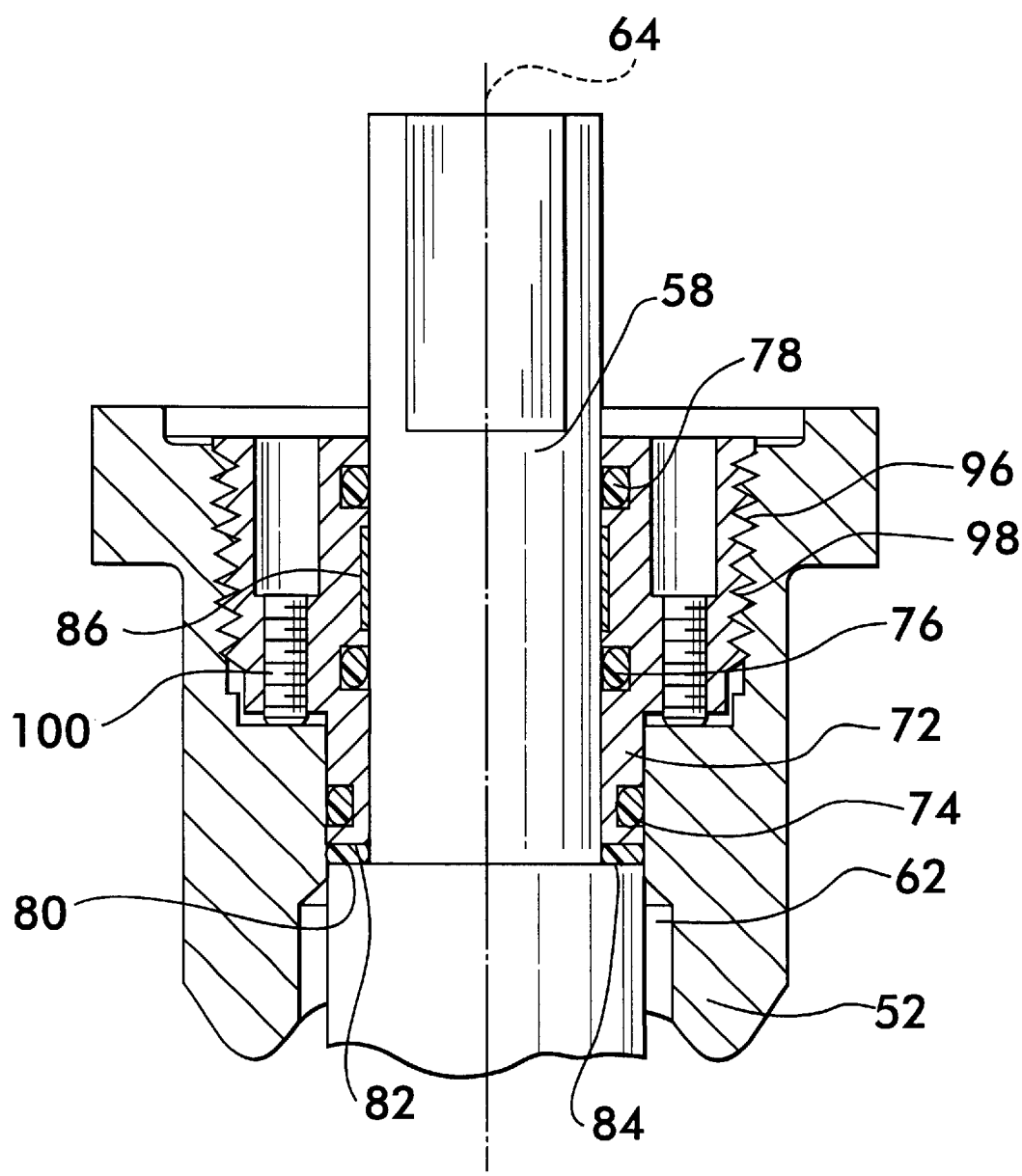
FIG. 4 is a detailed view of a portion of the valve shown in FIG. 3 on an enlarged scale.

Butterfly valve 50 has a cartridge 72 coaxially positioned in the upper passageway 62 between the upper valve stem 58 and the valve body 52. As shown in detail in FIG. 4, cartridge 72 houses a static seal 74 between the cartridge and the valve body 52 and two stem seals 76 and 78 positioned between the valve stem 58 and the cartridge, the seals preventing leakage from the valve bore 54 through the upper passageway 62. In addition, seal 78 prevents contamination of the upper bearing 86. The upper valve stem 58 has a radially extending contact surface 80 which engages a mating surface 82 positioned on the cartridge 72 facing bore 54 to retain the upper valve stem 58 within the upper passageway 62. Preferably, the engagement between the contact and mating surfaces is through a thrust bearing 84 which allows the upper valve stem to rotate relatively to the cartridge to effect rotation of the disc 56 between the open and closed positions without galling the cartridge or the valve stem. As best seen in FIG. 3, two radial bearings 84 and 86 are used to support the upper valve stem 58 within the upper passageway 62 and allow rotation of the valve stem. Two bearings are used due to the length of the upper valve stem with radial bearing 86 being positioned within the cartridge 72 as shown in FIG. 4. Bearing 86 also reacts any side loads due to valve actuation.

In addition to the advantages previously discussed, the cartridge, when used with a second valve stem, provides additional advantage as explained below.

For valves such as the slant disc butterfly valve 50 illustrated in FIG. 3, it is important that the slanted disc 56 be centered as accurately as possible within the valve bore 54 and held in that position with little or no displacement from center. These characteristics are desirable to ensure adequate continuous engagement between seal 68 and seat 70 to prevent leakage, to provide uniform seal wear for maximum valve life and to allow slanted disc 56 to be rotated between the open and closed positions with a minimum of torque on the upper valve stem 58.

Due to the tolerances in the manufacture of the valve stems, the valve body and the slanted disc, the disc does not center adequately within the bore at initial assembly of the valve. It has been the practice to use shims to correctly position the disc centrally within the valve bore. However, there are significant disadvantages to shimming. Shimming is necessarily a hand operation unique to each valve which increases the cost of the valve. Furthermore, reshimming when servicing a valve is not practical in the field. The final accuracy of the disc position is inherently limited by the size of the shims used and the skill and patience of the technician assembling the valve. Thus, despite the shimming process, valves are produced in which the disc may not be adequately centered or maintained in the centered position under the loads imposed by the differential pressure within the valve or the weight of the disc for larger valves.

The slant disc butterfly valve is especially susceptible to disc shifting from the bore center due to differential pressure loads within the valve. As seen in FIG. 3, the disc 56 is angularly oriented within bore 54. The angular orientation of the disc causes the disc and valve stems to experience loads perpendicular and parallel to axis 64 due to the differential pressure in the valve when it is closed. For example, if the right side of the valve is the high pressure side, the disc 56 will see loads directed upwardly along axis 64 as well as loads perpendicular to the axis. If there is free play in the disc along axis 64 as a result of the shimming process, the disc will be pushed upward, compressing seal 68 against the seat 70 on the upper portion of the valve bore 54 and lifting the seal 68 away from the seat 70 on the lower portion of the bore.

The unevenly loaded seal 68 will wear unevenly during actuation with the upper portion wearing out sooner and possibly causing metal to metal contact between the disc and the seat. This is very bad, as it will cause damage to the seat and disc, eventually requiring replacement of the valve. The lower portion of the seal 68, being pulled away from the seat, may not engage the seat with sufficient compressive force to effect a fluid tight seal, resulting in leakage through the valve. Finally, increased torque will be required to rotate the disc 56 between the open and closed positions if the disc is not properly centered within valve bore 54.

Cartridge 72 may be used in conjunction with lower valve stem 60 to adjustably position and secure disc 56 within valve bore 54 at a predetermined position along axis 64, allowing the disc to be perfectly centered within the bore and held in the centered position against the differential pressure loads.

Figure 5:
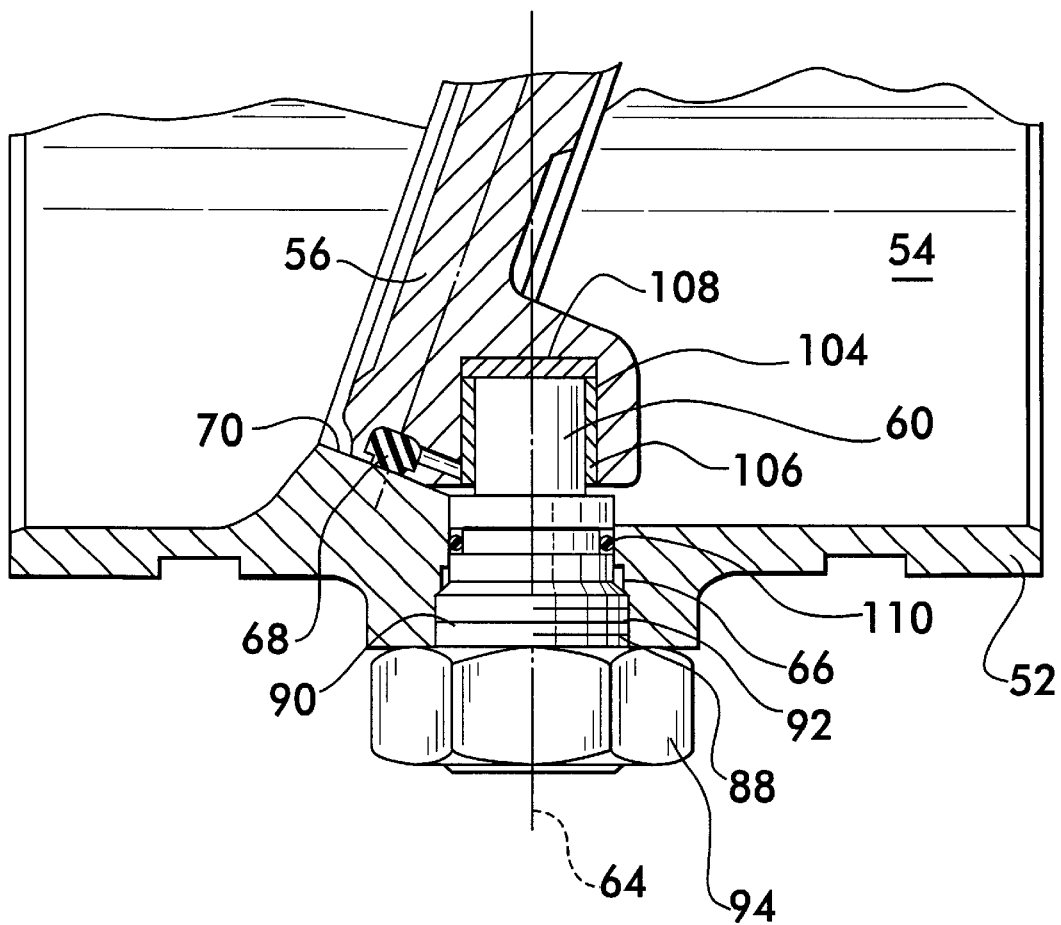
FIG. 5 is a detailed view of a portion of the valve shown in FIG. 3 on an enlarged scale.

To effect and maintain the centering of the disc 56 in valve bore 54, the upper and lower valve stems 58 and 60 are movable within the upper and lower passageways 62 and 66, respectively, along axis 64. As shown in FIG. 5, screw threads 88 are arranged circumferentially around a portion 90 of the lower valve stem 60. Screw threads 88 engage internal mating threads 92 arranged coaxially within lower passageway 66. The engaged screw threads 88 and 92 allow the lower valve stem 60 to be infinitely adjustably positioned within lower passageway 66 by rotating the lower valve stem in relation to the valve body 52. The screw threads will also act to secure the lower valve stem in a predetermined position within the lower passageway, as the valve stem will advance or retreat within the passageway only if rotated. To provide additional security against an undesired position shift which may cause free play in the disc, a jam nut 94 is used to fix the lower valve stem in position.

As shown in FIGS. 3 and 4, the upper valve stem 58 is permitted to float within the upper passageway 62 and is captured between the disc 56 and the cartridge 72 by means of the contact and mating surfaces 80 and 82, previously described. As shown in FIG. 4, cartridge 72 is adjustably secured within the upper passageway 62 by means of screw threads 96 arranged circumferentially on the cartridge. Upper passageway 62 has internal screw threads 98 coaxially arranged which engage screw threads 96 and allow the cartridge to be infinitely adjustably positionable within the upper passageway along axis 64. Rotating the cartridge relatively to the valve body 52 will cause it to advance or retreat to a predetermined axial position within the upper passageway. To ensure that the cartridge will not rotate inadvertently and shift in position, set screws 100 are provided which act between the cartridge and valve body to lock the cartridge in place.

Assembly of the valve using the cartridge 72 and upper and lower stems 58 and 60 to perfectly center disc 56 within valve bore 54 can be accomplished without shimming in the following manner. Referring to FIG. 3, with axis 64 oriented horizontally, disc 56 is positioned within the valve bore 54 with upper and lower sockets 102 and 104 aligned with upper and lower passageways 62 and 66, respectively, and circumferential seal 68 engaging valve seat 70. Due to the compression fit between the seal 68 and the seat 70, the disc will center itself within the bore. The lower valve stem 60 is then inserted into the lower passageway 66 and advanced via engaging screw threads 88 and 92 (see FIG. 5) until the valve stem engages socket 104 to rotatably support disc 56. Preferably, as best seen in FIG. 5, a radial bearing 106 is used in socket 104 to allow rotation of the disc relative to the lower stem. A thrust disc 108 is placed between the end of the valve stem and the socket to prevent galling and reduce actuation torque during rotation. The jam nut 94 is then used to lock the lower valve stem 60 in place. The lower passageway 66 is sealed against leakage by means of an elastomeric seal, such as an O-ring 110, positioned circumferentially around the lower stem within lower passageway 66.

As shown in FIG. 3, the upper valve stem 58 is inserted into upper passageway 62 to engage upper socket 102 on disc 56. The engagement between the upper socket and the upper valve stem is designed to transmit torque so that the disc 56 can be opened and closed by turning the upper stem. Once the upper valve stem is properly seated in upper socket 102, the cartridge 72 is inserted in the upper passageway 62 and advanced via engaging screw threads 96 and 98 (see FIG. 4) until the contact surface 80 on the upper valve stem 58 engages the mating surface 82 on the cartridge 72 through the thrust bearing 84 sandwiched between the surfaces. Set screws 100 are then tightened to prevent relative rotation of the cartridge and the disc 56 is perfectly centered within the bore 54, rotatably supported on and held securely in place by the upper and lower valve stems 58 and 60. Since the positions of the valve stems are infinitely adjustable, there is no significant free play between the valve stems and the disc. Thus, the disc will not shift when subjected to the differential pressure within the valve bore when the valve is closed.

Figure 6:
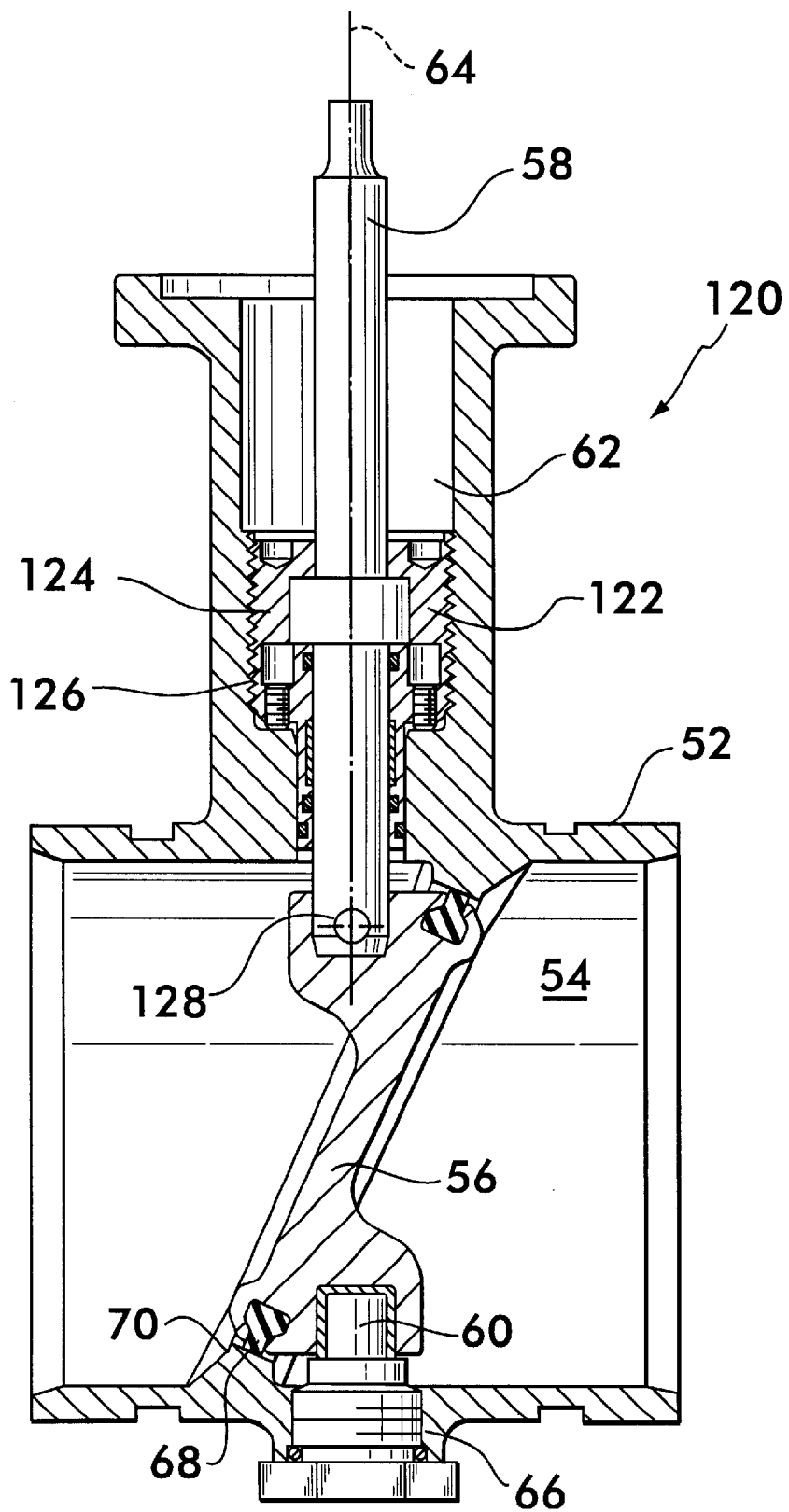
FIG. 6 is a longitudinal sectional view of an alternate embodiment of a butterfly valve according to the invention.
Figure 7:
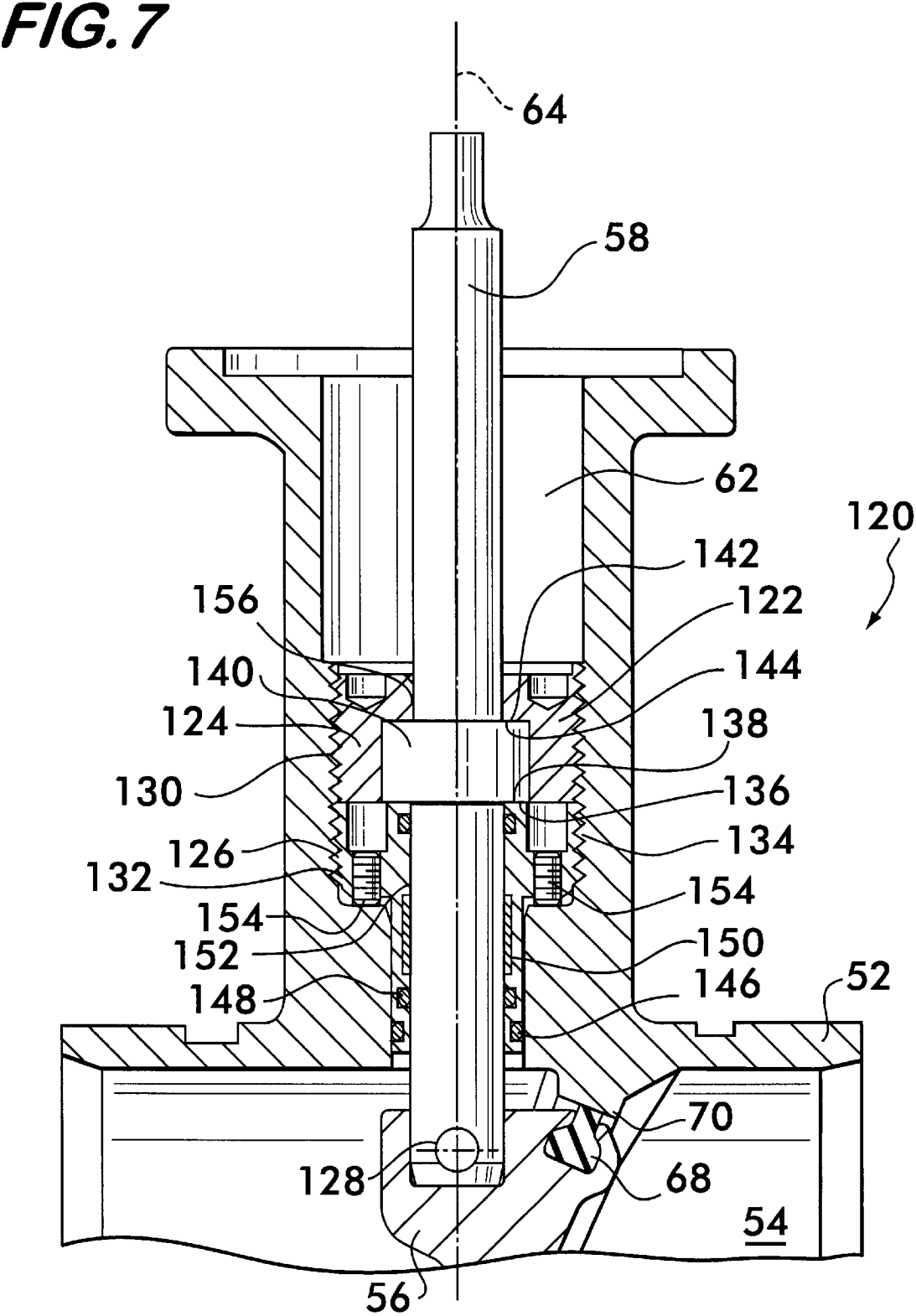
FIG. 7 is a detailed view of a portion of the valve shown in FIG. 6 on an enlarged scale.

An alternate embodiment of a butterfly valve 120 is shown in FIGS. 6 and 7. Upper valve stem 58 is adjustably positioned within upper passageway 62 by means of a cartridge 122 having an upper portion 124 and a lower portion 126. Upper valve stem 58 is captured between the upper and lower cartridge portions to prevent undesired motion along axis 64 within upper passageway 62. Upper valve stem 58 is attached to disc 56 by a fastener 128 which could be a pin, a screw or a bolt, for example. Fastener 128 locks the disc 56 to valve stem 58 thereby positioning the disc within valve bore 54 along axis 64, the position being infinitely adjustable by adjusting the position of upper and lower cartridge portions 124 and 126 within upper passageway 62 as described below. Note that in this alternate embodiment, lower valve stem 60 does not serve to position or secure disc 56 within bore 54 along axis 64, only the upper valve stem 58 performs this function.

Cartridge 122 is shown in detail in FIG. 7. Preferably, the cartridge is formed of two separate, independent components comprising the upper portion 124 and the lower portion 126, although alternate configurations wherein the upper and lower portions are separably joined together are contemplated. In the separate component embodiment shown, both the upper and lower portions have respective external screw threads 130 and 132 arranged circumferentially around each portion. The external screw threads 130 and 132 engage internal screw threads 134 positioned coaxially within upper passageway 62. The mating engagement of the external and internal screw threads allow the upper and lower cartridge portions 124 and 126 to be infinitely variably positioned and secured at a desired location along axis 64 within upper passageway 62 relatively to valve bore 54.

Valve stem 58 is captured between the upper and lower cartridge portions by means of mutually engaging surfaces positioned on the various parts. Lower cartridge portion 126 has a lower support surface 136 extending inwardly of upper passageway 62 and facing away from valve bore 54. Lower support surface 136 engages a lower contact surface 138 facing toward valve bore 54 and extending radially outwardly from upper valve stem 58. Lower contact surface 138 is preferably formed by a portion 140 of upper valve stem 58 having an enlarged diameter extending outwardly of the valve stem. Engagement of lower contact surface 138 with lower support surface 136 prevents motion of upper valve stem 58 toward valve bore 54, the valve stem being adjustably positionable relatively to the bore by rotating lower cartridge portion 126 using the screw threads to advance or retract the stem within the upper passageway 62.

Upper cartridge portion 124 has an upper support surface 142 extending radially inwardly of upper passageway 62 and facing toward valve bore 54. Upper support surface 142 engages an upper contact surface 144 facing away from valve bore 54 and extending radially outwardly from upper valve stem 58. Similarly to lower contact surface 138, upper contact surface 144 is preferably formed by a portion 140 of upper valve stem 58 having an enlarged diameter extending outwardly of the valve stem. Engagement of upper contact surface 144 with upper support surface 142 prevents motion of upper valve stem 58 away from valve bore 54, thus, capturing the valve stem and preventing stem blowout due to internal pressure within the valve bore 54 in the event that fastener 128 fails in any way. Preferably, both the upper and lower contact surfaces and the upper and lower support surfaces are oriented perpendicularly to axis 64 coaxial with upper passageway 62 to promote smooth rotation of the valve stem 58 relatively to the cartridge 122.

A static seal 146 is positioned within upper passageway 62 between the cartridge 122 and the valve body to prevent fluid leakage from the valve bore between the valve body 52 and the cartridge. Another seal 148 is positioned between the cartridge and the valve stem 58 also to prevent fluid leakage. Both seals are preferably positioned with the lower cartridge portion 126 near to the valve bore. Elastomeric seals, such as O-rings, are preferred and the cartridge 122 may be made of corrosion resistant material, such as stainless steel to ensure a long-lasting fluid-tight seal between the mating parts. Preferably, a bearing 150 is also located within the lower cartridge portion to support the valve stem against any lateral loads caused by differential pressure on the valve disc 56.

The valve 120 is preferably assembled in the following manner. Disc 56 is positioned within valve bore 54 with the disc 17 in the open position. If the weight of disc 56 is significant, the valve is positioned with valve passageway 62 horizontally oriented to prevent the disc from seating closer to the lower valve stem 60. Lower valve stem 60 is inserted through lower passageway 66 and secured therein to rotatably support disc 56 within bore 54. The lower valve stem does not support the disk along axis 64.

Next the lower cartridge portion 126 is positioned within upper passageway 62 by means of the mating screw threads 132 and 134. Upper valve stem 58 is then positioned longitudinally within the upper passageway 62 and inserted through lower cartridge portion 126 to engage disc 56, the lower cartridge portion having a bore 152 to accommodate the valve stem. With the disc in the open position, fastener 128 may then be inserted to lock the upper valve stem to the disc. If the lower cartridge portion 126 is located such that it prevents valve stem 58 from properly engaging disc 56 then the lower cartridge portion is advanced toward the valve bore 54 until proper engagement between upper valve stem and disc is possible.

Once the upper valve stem is locked to the disc, the disc is rotated to the closed position and centered with seal 68 engaging seat 70. The lower cartridge portion 126 is retracted away from the valve bore by means of the screw threads 132 and 134 until lower support surface 136 on the lower cartridge portion 126 engages the lower contact surface 138 on the upper valve stem. Lower cartridge portion 126 is then backed off toward the valve bore on the order of $\frac{1}{1000}$ of an inch to provide clearance between lower support surface 136 and lower contact surface 138 to prevent binding between the stem and the lower cartridge portion and allow for relative rotation therebetween. Once positioned with the desired clearance, the lower cartridge portion 126 is then locked into position within upper passageway 62, preferably by means of set screws 154, although other means such as anaerobic adhesives and jam nuts are also feasible.

The upper cartridge portion 124 is next positioned coaxially within upper passageway 62 between the upper valve stem and the valve body, the upper cartridge portion having a bore 156 to accommodate the valve stem. Upper cartridge portion 124 is advanced toward valve bore 54 by means of mating screw threads 130 and 134 until upper cartridge portion 124 contacts the lower cartridge portion 126. Upper cartridge portion 124 is dimensioned such that there is clearance on the order of $\frac{1}{1000}$ of an inch between upper support surface 142 and upper contact surface 144 preventing binding of the stem when it rotates relatively to the upper and lower cartridge portions. The upper cartridge portion is then locked into position by any of various aforementioned means, and the upper valve stem 58 is captured between the upper and lower cartridge portions, thus, fixing its position along axis 64 within the upper passageway 62 and, consequently, fixing the position of disc 56 along axis 64 within valve bore 54. With the disc 56 fixed along axis 64 and centered within the valve bore, the seal 68 should wear evenly and seal properly against valve seat 70 ensuring maximum seal life and proper valve operation with minimal leakage.

Valves constructed according to the invention enjoy many advantages over prior art valves. The cartridge provides for reliable sealing while eliminating the need for packing. The seals can be easily changed by removing the cartridge, thus, avoiding the need for extensive disassembly of the valve. The sealing surfaces on the cartridge can be machined to accurate dimensions and smooth finishes inexpensively as compared with machining of the valve body. Corrosion resistant material may be used for the cartridge, thus, avoiding leaks due to corrosion without making the entire valve body from the more expensive corrosion resistant material. Valves, such as butterfly valves, can be quickly assembled without the need for shimming, thus, reducing cost of the valve. Due to the infinite adjustability of the valve stems, the disc can be perfectly centered and secured in position, ensuring uniform seal wear for maximum seal life and minimum actuation torque during valve operation. Infinite adjustability of the valve stems also means that the valve components can be machined to larger dimensional tolerances, making the valve again less expensive. The accumulation of tolerances is easily compensated for by the infinite adjustability afforded by the cartridge and the upper and lower valve stems according to the invention.

What is claimed is:

1. A valve comprising:
    a valve body defining a valve bore;
    a first passageway extending through said valve body to said valve bore along an axis oriented transversely to said valve bore;
    a first elongated valve stem positioned coaxially within said first passageway;
    a valve closing member positioned within said valve bore and supported on said first valve stem, said valve closing member being rotatable about said axis between a first position allowing flow through said valve bore at a first flow rate, and a second position restricting flow through said valve bore;
    a cartridge positioned coaxially within said first passageway between said first valve stem and said valve body;
    a contact surface extending radially outwardly from said first valve stem, and a mating surface positioned on said cartridge facing said valve bore, said mating surface being engaged with said contact surface and retaining said valve stem within said first passageway.

2. A valve according to claim 1, further comprising a seal positioned in said first passageway between said cartridge and said valve stem.

3. A valve according to claim 2, wherein said cartridge is comprised of a corrosion resistant material.

4. A valve according to claim 3, wherein said corrosion resistant material comprises stainless steel.

5. A valve according to claim 1, further comprising an internal screw thread positioned coaxially within said first passageway, and an external screw thread arranged circumferentially on said cartridge for mating engagement with said internal screw thread for removably positioning said cartridge within said first passageway.

6. A valve according to claim 1, further comprising:
    a second passageway extending through said valve body to said valve bore and coaxially aligned with said first passageway;
    a second elongated valve stem positioned coaxially within said second passageway, said valve closing member being rotatably supported on said second valve stem, said first and second valve stems being movable along said axis transversely to said valve bore within said first and second passageways respectively; and
    means for adjustably securing each of said first and second valve stems at respective predetermined positions along said axis within said first and second passageways respectively, thereby adjustably positioning said valve closing member at a predetermined position along said axis within said valve bore.

7. A valve according to claim 1, further comprising a radial bearing located coaxially within said cartridge and supporting said first valve stem.

8. A valve according to claim 1, wherein said valve closing member comprises a ball sized to sealingly fit within said valve bore, said ball having an aperture therethrough, said aperture being positionable in fluid communication with said valve bore upon rotation of said ball into said first position, thereby allowing said flow through said valve bore.

9. A valve according to claim 1, further comprising:
    a second passageway extending through said valve body to said valve bore and coaxially aligned with said first passageway;

a second elongated valve stem positioned coaxially within said second passageway, said valve closing member being supported on said second valve stem, said first and second valve stems being movable along said axis transversely to said valve bore within said first and second passageways respectively; and means for adjustably securing each of said first and second valve stems at respective predetermined positions along said axis within said first and second passageways respectively, thereby adjustably positioning said valve closing member at a predetermined position along said axis within said valve bore.

10. A valve according to claim 9, wherein said adjustable securing means for said first valve stem comprises:

first screw threads arranged on said valve body coaxially within said first passageway;

second screw threads arranged circumferentially on said cartridge for mating engagement with said first screw threads, said cartridge being adjustably positionable along said axis within said first passageway upon relative rotation between said cartridge and said valve body; and a surface on said cartridge arranged facing said valve bore and movable into engagement with a mating surface extending radially outwardly from said first valve stem, said first valve stem being adjustably secured between said cartridge and said valve closing member upon engagement of said surface and said mating surface.

11. A valve according to claim 10, wherein said adjustable securing means for said second valve stem comprises third screw threads arranged on said valve body coaxially within said second passageway, and fourth screw threads arranged circumferentially around a portion of said second valve stem for mating engagement with said third screw threads, said second valve stem being adjustably positionable along said axis within said second passageway upon relative rotation between said second valve stem and said valve body.

12. A valve according to claim 2, wherein said seal comprises an elastomeric seal.

13. A valve according to claim 12, wherein said elastomeric seal comprises an O-ring.

14. A valve comprising:

a valve body defining a valve bore;

a first passageway extending through said valve body to said valve bore along an axis oriented transversely to said valve bore;

a first elongated valve stem positioned longitudinally within said first passageway, said valve stem having lower and upper contact surfaces extending outwardly from said stem, said lower contact surface facing toward said valve bore, said upper contact surface facing away from said valve bore;

a valve closing member positioned within said valve bore and supported on said first valve stem, said valve closing member being rotatable about said axis between a first position allowing flow through said valve bore at a first flow rate, and a second position restricting flow through said valve bore; and a cartridge located coaxially within said first passageway between said first valve stem and said valve body, said cartridge comprising a lower portion adjustably positionable within said first passageway and having a lower support surface engageable with said lower contact surface, said cartridge comprising an upper portion adjustably positionable within said first passageway and having an upper support surface engageable with said upper contact surface, said stem being captured between said upper and lower portions and thereby adjustably positionable within said first passageway.

15. A valve according to claim 14, wherein at least one of said upper and lower support surfaces is oriented perpendicularly to an axis arranged coaxially with said first passageway.

16. A valve according to claim 15, wherein at least one of said upper and said lower contact surfaces is formed by a portion of said first valve stem having an enlarged diameter extending outwardly of said valve stem.

17. A valve according to claim 14, wherein said valve further comprises a seal positioned between said valve stem and said cartridge for preventing fluid flow from said valve bore between said cartridge and said stem.

18. A valve according to claim 17, wherein said seal comprises an elastomeric seal.

19. A valve according to claim 17, wherein said seal is positioned in said cartridge lower portion.

20. A valve according to claim 17, wherein said cartridge comprises a corrosion resistant material.

21. A valve according to claim 14, further comprising internal screw threads arranged coaxially within said first passageway, and external screw threads arranged circumferentially around one of said cartridge upper and lower portions, said external screw threads being engageable with said internal screw threads for-adjustably positioning said cartridge within said first passageway.

22. A valve according to claim 21, wherein said cartridge upper and lower portions comprise two independent components forming said cartridge.

23. A valve according to claim 22, further comprising external screw threads arranged circumferentially around the other of said cartridge upper and lower portions, said external screw threads around said cartridge upper and lower portions being engageable with said internal screw threads for adjustably positioning said cartridge upper and lower portions within said first passageway independently of each other.

24. A valve according to claim 14, further comprising a second passageway extending through said valve body to said valve bore and coaxially aligned with said first passageway, and a second elongated valve stem positioned longitudinally within said second passageway, said valve closing member being rotatably supported on said second valve stem.

25. A valve according to claim 24, wherein said second valve stem is movable along said axis transversely to said valve bore within said second passageway, said second valve stem having means for adjustably positioning said second valve stem within said second passageway.

26. A valve according to claim 25, wherein said adjustable positioning means comprises internal screw threads arranged coaxially within said second passageway, and external screw threads arranged circumferentially around said second valve stem, said external screw threads on said second valve stem being engageable with said internal screw threads within said second passageway for adjustably positioning said second valve stem within said second passageway.

27. A valve according to claim 24, wherein said valve closing member comprises a disc having a surface oriented transversely to said valve bore and a circumference continuously sealingly engageable with said valve bore, said surface being positioned transversely to said flow and said circumference continuously sealingly engaging said valve bore upon rotation of said disc into said second position.

28. A valve according to claim 27, wherein said surface of said disc is angularly oriented with respect to said axis.

29. A valve according to claim 24, wherein said axis is oriented perpendicularly to said valve bore.

30. A valve according to claim 24, wherein said axis passes through a diameter of said valve bore.

31. A valve comprising:

a valve body defining a valve bore;

a first passageway extending through said valve body to said valve bore along an axis oriented transversely to said valve bore;

a second passageway extending through said valve body to said valve bore and coaxially aligned with said first passageway;

a first elongated valve stem positioned coaxially within said first passageway and movable therein transversely to said valve bore along said axis, said first valve stem having a contact surface extending radially outwardly therefrom;

a second elongated valve stem positioned coaxially within said second passageway and movable therein transversely to said valve bore along said axis;

a valve closing member positioned within said valve bore and supported on said first and second valve stems, said valve closing member being rotatable about said axis between a first position allowing flow through said valve bore at a first flow rate and a second position restricting flow through said valve bore;

an annular cartridge positioned coaxially within said first passageway between said first valve stem and said valve body, said cartridge having a mating surface facing said valve bore and movable into engagement with said contact surface extending radially outwardly from said first valve stem; and means for adjustably securing each of said first and second valve stems within said first and second passageways respectively at respective predetermined positions along said axis, thereby adjustably positioning said valve closing member at a predetermined position along said axis within said valve bore.

32. A valve according to claim 31, wherein said adjustable securing means for said first valve stem comprises:

first screw threads arranged on said valve body coaxially within said first passageway; and second screw threads arranged circumferentially on said cartridge for mating engagement with said first screw threads, said cartridge being adjustably positionable along said axis within said first passageway upon relative rotation between said cartridge and said valve body, said first valve stem being adjustably secured between said cartridge and said valve closing member upon engagement of said contact surface and said mating surface.

33. A valve according to claim 32, wherein said adjustable securing means for said second valve stem further comprises third screw threads arranged on said valve body coaxially within said second passageway, and fourth screw threads arranged circumferentially around a portion of said second valve stem for mating engagement with said third screw threads, said second valve stem being adjustably positionable along said axis within said second passageway upon relative rotation between said second valve stem and said valve body.

34. A valve according to claim 33, wherein said valve closing member comprises a disc having a surface oriented transversely to said valve bore and a circumference continuously sealingly engageable with said valve bore, said surface being positioned transversely to said flow and said circumference continuously sealingly engaging said valve bore upon rotation of said disc into said second position.

35. A valve according to claim 34, wherein said surface of said disc is angularly oriented with respect to said axis.

36. A valve according to claim 32, wherein said first valve stem is rotatable relatively to said cartridge and fixed to said valve closing member, said valve closing member being rotatable between said first and second positions upon rotation of said first valve stem.

37. A valve according to claim 31, wherein said cartridge further comprises a seal positioned between said cartridge and said valve stem.

38. A valve according to claim 37, wherein said cartridge comprises a corrosion resistant material.

39. A valve according to claim 31, wherein said axis is oriented perpendicularly to said valve bore.

40. A valve according to claim 39, wherein said axis passes through a diameter of said valve bore.

41. A valve comprising:

a valve body defining a valve bore;

a first passageway extending through said valve body to said valve bore, said first passageway having internal screw threads;

a first elongated valve stem positioned coaxially within said first passageway and movable therein transversely to said valve bore, said first valve stem having a surface extending radially outwardly therefrom;

a cartridge positioned coaxially within said first passageway between said first valve stem and said valve body, said cartridge having external screw threads engageable with said first passageway internal screw threads for adjustably positioning said cartridge relatively to said valve bore, said cartridge having a mating surface engageable with said first valve stem surface for retaining said first valve stem within said first passageway;

a second passageway extending through said valve body to said valve bore and coaxially aligned with said first passageway, said second passageway having internal screw threads;

a second elongated valve stem positioned coaxially within said second passageway and having external screw threads engageable with said second passageway internal screw threads for adjustably positioning said second valve stem relatively to said valve bore; and a valve closing member positioned within said valve bore and supported on said first and second valve stems for rotation about an axis oriented coaxially with said passageways, said valve closing member being rotatable between a first position allowing flow through said valve bore and a second position restricting flow through said valve bore, said valve closing member being adjustably positionable at a predetermined position along said axis within said valve bore upon rotation of said cartridge and said second valve stem relatively to said valve body.

* * * * *